Oct. 7, 1969     H. F. DUNLAP     3,470,953
MODIFICATION OF CHIMNEY GEOMETRY PRODUCED BY CONTAINED
NUCLEAR EXPLOSIVES
Filed April 3, 1967

EVENT

EMPLACEMENT OF TWO LATERALLY
SPACED NUCLEAR EXPLOSIVES

TIME: 0

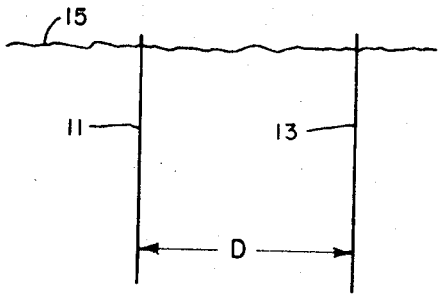

Fig. 1

DETONATION AND EXPANSION OF
FIRST EXPLOSIVE TO FORM FIRST
CAVITY

TIME: 0 – 5 M SEC

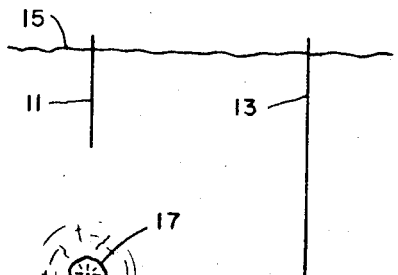

Fig. 2

DETONATION, EXPANSION AND CRATER-
ING OF SECOND EXPLOSIVE
INTO FIRST CAVITY BEFORE
COLLAPSE OF FIRST CAVITY

TIME: 0.02 SECOND TO A FEW
HOURS

CHIMNEY FORMATION

TIME: FEW SECONDS TO DAYS

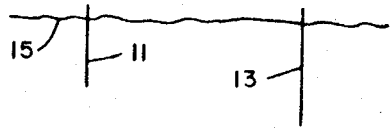

Fig. 3

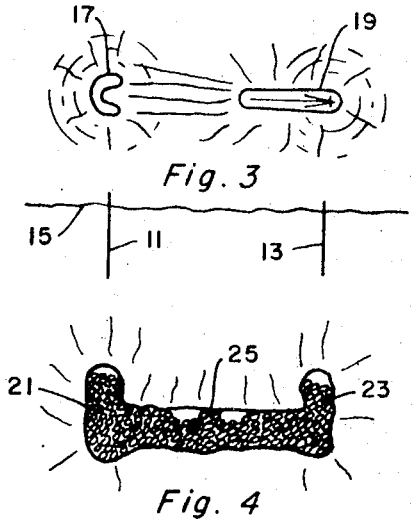

Fig. 4

INVENTOR
Henry F. Dunlap
BY

*Blucher & Sharp*

Attorney

United States Patent Office 3,470,953
Patented Oct. 7, 1969

3,470,953
MODIFICATION OF CHIMNEY GEOMETRY PRODUCED BY CONTAINED NUCLEAR EXPLOSIVES
Henry F. Dunlap, Dallas, Tex., assignor to Atlantic Richfield Company, Philadelphia, Pa., a corporation of Pennsylvania
Filed Apr. 3, 1967, Ser. No. 628,143
Int. Cl. E21b 43/26
U.S. Cl. 166—247      22 Claims

ABSTRACT OF THE DISCLOSURE

Two nuclear explosives are placed deep enough to be contained at about the same depth of burial and are spaced laterally apart by a distance not exceeding the distance that the second explosion will crater into the first explosion. The two explosives are fired in a timed sequence so that the second explosion occurs in the interval between the time that a spherical cavity is formed by the first explosion and this cavity collapses.

BACKGROUND OF THE INVENTION

This invention pertains to a method of forming a horizontally extended volume of high permeability below the surface of the earth by detonating laterally spaced nuclear explosives in a special time sequence.

Since the Plowshare Program was established to investigate and develop peaceful uses for nuclear explosives, underground nuclear tests have been carried out in the United States in various rock types, including alluvium, tuff, granite, dolomite and salt. These tests provide sufficient understanding of the phenomena involved to predict the effects of nuclear explosions in diverse rock media. In all tests, except for a minor few tests involving very low yield explosions (five kilotons and less) in very competent formations, the explosion results in a vertically extended, cylindrical, rubble-filled chimney.

The events leading to the formation of this cylindrical vertical chimney of broken rock involve emplacing in a borehole a nuclear explosive (a fusion or fission, or combination bomb) of sufficient yield to product an unstable cavity which will collapse to form the chimney. The nuclear explosive is detonated, producing in microseconds high amounts of energy and heat that are unthinkable in any other form of explosive even though it is standard practice to state the yield of a nuclear device in terms of kilotons of TNT (trinitrotoluene).

Upon detonation, an initial cavity is formed as a result of vaporization, melting and crushing of adjacent rock media. The gases within the cavity are at extremely high temperature on the order of millions of degrees and pressure amounting to millions of atmospheres. The expanding energy of the gases compacts and thrusts the surrounding rock outward, creating in fractions of a second a spherical cavity. This high internal pressure expands the cavity until the internal pressure is equivalent to the overburden pressure. At this point the gas pressure supports the overburden, thus preserving the shape of the cavity for a temporary period of time. The radius of the cavity is a function of the energy yield of the explosive, and, to a much lesser extent, the rock media characteristics and depth of burial.

After a period of time, as heat losses, gas leak off, and vapor condensation occur, the pressure is reduced until the pressure within the cavity is below the overburden pressure and the fractured rock above the cavity can no longer be supported. The roof of the cavity collapses in bits and pieces which periodically fall to the bottom of the cavity. A cylindrical column (chimney) of broken rock develops upward as the cavity fills with rock falling from the roof. Roof collapse continues progressively upward until the volume or interstitial space between the pieces of broken rock in the chimney approximates the original cavity volume before the cavity began to collapse.

The vertical, cylindrical volume of broken rock, called a chimney, has the same diameter as the original cavity and has a height of about four or five times the cavity radius. The ratio of chimney height to original cavity radius is, therefore, dependent on the bulk porosity of the broken chimney rock and the cavity volume before collapse. More explicitly, the height of the chimney is about four times the cavity radius divided by three times the net increase in porosity in the rubbled zone stated in a fraction. This fraction ranges between 0.2 and 0.3 and for petroleum reservoirs will probably be on the order of 0.25.

Patent No. 3,303,881 to Dixon and two articles, "Economics of Producing Shale Oil by the Nuclear In Situ Retorting Method," M. A. Lekas, Third Symposium on Oil Shale, Colorado School of Mines, April 14, 1966, and "Fracturing Oil Shale with Nuclear Explosives for In-Situ Retorting," M. A. Lekas and H. C. Carpenter, Second Symposium on Oil Shale, Quarterly of the Colorado School of Mines, vol. 60, No. 3, July 1965, have proposed the use of a properly emplaced array of nuclear explosives to create lateral masses of broken rock. Insofar as these proposals relate to laterally extending masses of broken rock, the disclosures teach that multiple shots could be fired in two ways. The shots could be fired simultaneously. When two shots are fired simultaneously, each shot occurs before a cavity is formed by another shot. As an alternative, laterally spaced shots could be fired in sequence. This would be done by drilling an emplacement hole and loading and firing each hole before drilling the next hole. When two shots are fired in this manner, the second shot is fired after a chimney is formed by the first shot. The second laterally spaced explosion, if properly spaced from the first shot, creates fractures in the rock media between the two shots, but there is little or no change in individual chimney geometry.

It is desirable to modify the chimney geometry to produce a laterally extending volume having less vertical height than the chimneys obtained in the usual manner. This invention provides a method of changing chimney geometry when detonating two or more nuclear explosions.

SUMMARY

The chimney produced by a subsurface, contained nuclear explosion is a cylinder with a height several times its diameter. It is desirable to modify this geometry in hydrocarbon production so that the explosive effects are more nearly confined to a high permeability volume extending laterally from the nuclear explosion than a cylindrical volume extending vertically from the point of explosion. This is achieved by placing two or more nuclear explosives far enough below the surface to be contained. The explosives are spaced laterally apart at about the same depth of burial and fired in a special time sequence. The explosions are timed so that the second explosion occurs in the interval between the time that the spherical cavity is formed by the first explosion and the roof of this first cavity collapses significantly. The latter spacing is such that some of the earth between the explosives will crater into the cavity formed by the first explosion.

When the two explosions are located and fired in this manner, the wall of the cavity formed by the first explosion provides a free surface. The second explosion craters this free surface into the first cavity in a manner similar to the way that a nuclear explosion at shallow depths craters at the ground surface. Since the second explosion craters rock into the first cavity, the first cavity is at least partially filled by broken rock brought in from the side of the cavity rather than from collapse of the cavity roof. The first result is that there is much less vertical growth of the first cavity. The second result is that the cavity formed by the second shot is smaller than normal since the expanding gases of the second explosion are vented into the first cavity before cavity expansion from the second shot is complete. This lowers the gas pressure in the second cavity resulting in a smaller cavity radius. The third result is that cratering of the rock between the two cavities forms an unstable horizontally extended, intermediate volume which in turn collapses. The over-all result is to essentially turn the great vertical chimney of a single contained nuclear explosion on its side. This result is greater for succeeding explosions fired in this timed sequence. Use of multiple contained nuclear explosions has been suggested before, but this special timing for the explosions has not been suggested previously. It has not been suggested that it is advantageous to fire a second explosion in such a manner that it craters into a cavity formed by a first shot before the first chimney forms and after the first cavity is formed.

BRIEF DESCRIPTION OF DRAWINGS

FIGURES 1, 2, 3 and 4 illustrate the sequence of events leading to a horizontally extended volume of high permeability.

DESCRIPTION OF PREFERRED EMBODIMENTS

As illustrated in FIGURE 1, a first and a second nuclear explosive are emplaced in boreholes 11 and 13 far enough below surface 15 of the earth to be contained when the nuclear explosives are detonated. A nuclear explosion is contained when the explosive energy will not crater at the surface of the earth. This depth of burial confines the expanding energy of the explosions so that the expanding forces propagate along the paths hereafter described. The two nuclear explosives will usually be placed at about the same depth and located in or just below a hydrocarbon bearing zone.

The nuclear explosives are spaced laterally from each other by predetermined lateral spacing (D). The lateral spacing (D) is such that when the first nuclear explosive is detonated and the second nuclear explosive is thereafter detonated, some of the earth between the two nuclear explosives will crater into the cavity formed by first nuclear explosive. A cavity is a large space unfilled with significant amounts of broken solid material and provides a free surface which the expanding gases of a nuclear explosion may crater. An explosion craters a surface of a cavity when energy from the explosion causes rock located between the explosion and the surface of the cavity to blow into the cavity. Best results are obtained by increasing the lateral spacing of the two explosives provided that the second explosion is still capable of cratering large amounts of rock into the cavity created by the first explosion. This lateral spacing will be between two and fifteen times the cavity radius for the second nuclear explosive when the cavity radius in feet is calculated according to Equation 2 hereinafter defined. Since the free surface of the cavity is comparable to the surface of the earth, the results obtained from nuclear experiments where the explosion cratered at the surface of the earth may be used to determine more preferred values for lateral spacing distance (D) at which a nuclear explosion will crater into a laterally spaced cavity. These experiments are also useful in determining a depth of burial for containment of the explosive energy. A review of the results of 60 nuclear blast experiments indicates that there is better than a 90 percent chance that the nuclear blast will crater to a free surface if the scaled distance of separation is about 300 feet. Scaling takes into consideration the yield of the explosive. Some nuclear explosives cratered to the surface of the earth at scaled distances as great as 650 feet; therefore, a scaled distance of separation of 650 feet is a preferred upper limit for calculating the distance (D). For maximum assurance, however, that the second explosion will blow substantial amounts of rock into the first cavity, the scaled distance of separation should be 300 feet or less.

The same test results indicate that a nuclear explosion will not crater at the surface of the earth when the scaled depth of burial is greater than about 700 feet. One nuclear blast did not crater at a scaled depth of burial of 350 feet; therefore, a minimum scaled depth of burial could be set at about 350 feet. Dynamic venting at the surface of the earth will usually be prevented if there is at least a 300-foot buffer zone between the surface and the top of the chimney. The chimney height for nuclear explosions detonated in a standard manner is between four and five times the cavity radius. Of course, there is less chance that the second explosion will crater to the surface since the distance of separation will be substantially less than the depth of burial and the second explosion craters into the first cavity.

The scaled distance of separation (SDS) in feet is converted to the actual distance of separation (D) in feet by the following Equation 1:

$$D = (SDS)(W^{1/3.4}) \qquad (1)$$

where W is the yield of the nuclear device in kilotons. The scaled depth of burial is similarly related to the actual depth of burial.

Although the optimum yield for the two nuclear devices will largely depend on how the formation surrounding the nuclear explosion is to be exploited, it can be said that the size of the first explosive should be large enough to provide an unstable cavity having a surface area large enough to accomplish the purposes hereof, that is, the first explosive provides a surface for the second explosive to crater. A cavity is unstable when the roof of the cavity will collapse after the energy for expanding the cavity has been dissipated. The first explosive also provides an unstable cavity large enough to receive large amounts of broken rock which according to this invention will be blown into the first cavity by the second explosion. The second explosion has a yield which provides sufficient energy to crater rock laterally into the first cavity while producing a second unstable cavity. The yield of each of the two explosives will be at least five kilotons, and, as a practical matter, will usually be ten kilotons and greater. The radius of the cavity produced by each explosive is a function of the energy yield of the explosive and, to a lesser extent, the depth of burial, the average density of the overlying formations, the vapor forming liquid content of the host rock, and the rock properties. The equation for the cavity radius is $$R = \frac{CW^{1/3}}{(dh)^{1/4}} \qquad (2)$$

where R is the cavity radius in feet, C is a constant depending upon rock and fluid content and ranges between 225 and 345, W is the expected yield of the particular nuclear device in equivalent kilotons of TNT, d is the average overburden density in grams per cubic centimeter ranging from about 1.6 to 2.7, and h is the depth of burial in feet.

The method of this invention is best applied to and particularly covers hydrocarbon bearing formations; for example, oil sands, oil shale, tar sands, kerogen, peat, lignite, bituminous and anthracite coals, bituminous limestones and the like. There is no question that the effects described herein will take place in these types of formations. For these formations, a suitable estimate of the results for different depths of burial and yields can be derived by using a value of 290 for the constant C, 2.2 for d and a scaled distance of separation of 300 feet in Equations 1 and 2. The results are given in the table and are based on the assumption that both nuclear explosives have the same yield.

TABLE

| Depth of burial, ft. | Scaled depth of burial, ft. | Yield, kilotons | First cavity radius, ft. | Distance of separation, ft. | Ratio, DS/CR |
|---|---|---|---|---|---|
| 1,000 | 625 | 5 | 72 | 480 | 6.7 |
| 1,000 | 510 | 10 | 91 | 588 | 6.5 |
| 1,000 | 416 | 20 | 110 | 720 | 6.5 |
| 2,000 | 1,020 | 10 | 77 | 588 | 7.6 |
| 2,000 | 833 | 20 | 97 | 720 | 7.4 |
| 2,000 | 680 | 40 | 122 | 882 | 7.2 |
| 2,000 | 555 | 80 | 153 | 1,080 | 7.1 |
| 3,000 | 1,530 | 10 | 69 | 588 | 8.5 |
| 3,000 | 955 | 50 | 118 | 942 | 8.0 |
| 3,000 | 780 | 100 | 149 | 1,152 | 7.7 |
| 3,000 | 488 | 500 | 255 | 1,840 | 7.2 |

In the table, the ratio of the distance of separation to the cavity radius gives approximate lateral spacing between shots in terms of the cavity radius thereby illustrating the advantages of this system of firing nuclear explosions. It should be noted that this ratio is conservatively derived because the scaled distance of separation was conservatively set at 300 feet to assure cratering between cavities. Actually the distance from shot point to shot point could safely be increased since the cavity radius of the first cavity could be added to cratering distance. If this is done, each ratio in the column entitled Ratio, DS/CR would be increased one unit. This ratio shows how much rock is broken laterally and is concentrated in a horizontal chimney rather than a vertical chimney.

As illustrated in FIGURE 2, after the nuclear devices have been emplaced and readied for firing, the first nuclear device is detonated to create first cavity 17. The energy of the explosion is generated in microseconds and frequently develops temperatures on the order of ten million degrees Fahrenheit and pressures of seven million atmospheres. The heat and pressure proceed radially outward from the shot point vaporizing, melting and crushing the enveloping medium forming an expanding cavity. Since the explosion is contained and restricted by resisting forces, the energy tends to expand the cavity uniformly in all directions with a slightly greater radius in the top half of the cavity. The shock wave from the first explosion will reach the second explosive in less than 0.05 second; therefore, if the second explosive is not detonated on or before this shock wave reaching the second explosive, it may be necessary to prevent mechanical damage to the second explosive so that the second device will survive the severe acceleration of thousands of gravities caused by the first shock wave. For example, shock suspension cradles allowing the second device to move a foot or more would reduce peak acceleration to safe limits and the second device could be weighted to further reduce acceleration. In less than 500 milliseconds the cavity will reach its final size. It usually takes from 0.1 to 0.5 of a second for the cavity to reach its final size. For example, in the Rainer experiment, the cavity reached its final radius of 65 feet in 100 milliseconds. As mentioned previously the yield of the first explosion is such that the first cavity is unstable, that is, the roof of the cavity would fall into the cavity under normal conditions. In this method, however, as will hereafter be shown, the second nuclear device is detonated before a significant portion of the roof of the first cavity collapses. Collapse is significant when the amount of rock is greater than ten volume percent of the cavity.

In prior nuclear tests, the time interval between when a nuclear device is detonated and the cavity starts to collapse has varied. The cavity normally stands for at least three seconds to three minutes, and longer depending on rock properties and yield of the explosion. In addition, the roof collapses by bits and pieces; consequently, it takes a measurable time to build up a significant amount of broken rock in the cavity.

After first cavity 17 formed by the first nuclear explosion has reached its final cavity size, and before first cavity 17 collapses, the second nuclear explosion is detonated as illustrated in FIGURE 3. It has previously been noted that the second nuclear device is spaced laterally from the first cavity by a distance such that the energy from the second nuclear explosion will force rock between the two explosions to crater into the side of the first cavity. This is possible only because the first cavity has not yet collapsed.

As in the first explosion, the instantaneous energy developed by the second explosion quickly forms expanding spherical cavity 19. The shock wave from the second explosion travels much faster than the second cavity expands. When this shock wave reaches the empty spherical cavity formed by the first explosion, forces due to reflection of the shock at this free surface and the greater compressibility of this cavity compared to native rock cause the desired cratering into the side of the first cavity. The permeable path opened in this way from the second cavity to the first allows the hot expanding gases from the second explosion to flow through the rock between the two explosions, ever enlarging the path of penetration until the energy of these gases is vented into the first cavity.

The second shot could be fired within 0.02 to 0.05 second of the first explosion, that is, before the shock wave from the first explosion reaches the second nuclear explosive, but this timing would cause interaction of shock waves and make it less likely that rock would crater into the first cavity. It is difficult to predict what would occur. The first cavity usually reaches its final size within 0.1 to 0.5 second; therefore, it is best to detonate the second explosion at least 0.1 second after the first explosion and, more preferably, at least 0.5 second after the first explosion. The second explosion in all cases could be reliably delayed for a second after the explosion because rock falling from the roof of the first cavity falls only 16 feet in the first second. One second is less than any observed cavity collapse time in all contained nuclear blast experiments. In most instances, the second explosion could be delayed as long as three minutes. Even if the first cavity started to collapse sooner, it would take time to build up a significant amount of broken rock in the cavity. Longer times have been encountered in unstable cavities. In one experiment, called Hardhat, involving a 4.5-kiloton yield device exploded 950 feet below the surface in granite, the cavity stood for 11 hours, but this is an upper limit on the time delay. This method of this invention will usually involve explosives having a yield two or more times the yield in the Hardhat experiment in hydrocarbon bearing formations that are much less stable than granite; consequently, the cavities will be much less stable and much shorter collapse times will be encountered.

The moment for detonating the second nuclear explosive could also be determined seismically at the surface of the earth after the initial seismic waves caused by the explosion have subsided. It will be recalled that the roof of an unstable cavity collapses in bits and pieces over an extended period of time. The pieces of rock falling to the bottom of the cavity generate seismic waves when striking the bottom. These seismic waves travel to the surface where the waves may be detected by a seismometer. Thus, the second nuclear explosive will be detonated when these seismic waves are first detected.

After the two explosions have been detonated as illustrated in FIGURE 4, the roofs of the unstable cavities formed by the two explosives and of the unstable path between the two cavities collapse, filling the void space with broken rock. This continues until the roof supports the overburden and until the volumes in the cavities and flow path are translated to the interstitial space between the broken rock which normally has a bulk porosity between 0.2 and 0.3. This forms a laterally extended chimney between two shortened vertical chimneys rather than forming two separate tall vertical chimneys. Chimney 21 of the first cavity is shorter than usual since the cavity has already been partially filled by broken rock blown in from the side. This blown-in rock decreases the available volume to be translated into interstitial space between the pieces of rock settling from the roof of the cavity. The height of chimney 23 from the second cavity is reduced since the energy of the explosion was directed laterally toward the first cavity and vented into the first cavity. It is expected that the height of these chimneys will be reduced one-third or more. The flow path provides connecting laterally extended chimney 25.

A series of nuclear explosions could be fired in the same manner that the second explosion is detonated. If third, fourth, fifth, etc., explosions are used in this manner, the effects described will continue to be cumulative, although the amount of change in effects between subsequent explosions will be decreased as more and more shots are fired. In other words, the third explosion in the sequence will crater rock into the second cavity before significant collapse of the second cavity, and hot gas from the third cavity would be vented to the large volumes associated with the first and second cavities, so that the cavity formed by the third explosion would be even smaller than the second cavity. The effects for succeeding explosions, e.g. the fourth and fifth in the series, will be similar.

Several nuclear explosions could also be placed in various lateral arrays and detonated in accordance with this method of detonating the first and second nuclear explosions.

I claim:

1. A method of forming a horizontally extended volume of high permeability below the surface of the earth, which process comprises:
   (a) placing a first and a second nuclear explosive far enough below the surface of the earth to be contained, when said nuclear explosives are detonated, said second nuclear explosive being spaced laterally from said first nuclear explosive by a predetermined distance, said predetermined distance being such that when said first nuclear explosive is detonated and said second nuclear explosive is thereafter detonated, some of the earth between said second nuclear explosive and said first nuclear explosive will crater into the cavity formed by said first nuclear explosive,
   (b) detonating said first nuclear explosive to create a first nuclear explosion and a first cavity, and
   (c) detonating said second nuclear explosive to create a second nuclear explosion a predetermined time after said first nuclear explosion, said predetermined time being such that said second nuclear explosion occurs after said first cavity is formed by said first nuclear explosion and before said first cavity collapses.

2. The method of claim 1 wherein the predetermined time for detonation of said second explosive is at least 0.1 second after the first explosion.

3. The method of claim 2 wherein the predetermined distance that said two nuclear explosives are laterally spaced is a scaled distance of separation of 650 feet or less.

4. The method of claim 3 wherein the horizontally extended volume of high permeability is created in a hydrocarbon bearing formation.

5. The method of claim 3 wherein the predetermined distance that said two nuclear explosives are laterally spaced is a scaled distance of separation of 300 feet or less.

6. The method of claim 2 wherein the predetermined distance that said two nuclear explosives are laterally spaced is between 2 and 15 times the cavity radius for said second nuclear explosive when said cavity radius is determined in accordance with the following equation:

$$R = \frac{CW^{1/3}}{(dh)^{1/4}}$$

where R is said cavity radius in feet, C is a constant ranging between 225 and 345, W is the expected yield of said second nuclear explosion in equivalent kilotons of TNT, $d$ is the average overburden density in grams per cubic centimeter ranging from about 1.6 to 2.7, and $h$ is the depth of burial in feet.

7. The method of claim 6 wherein the two nuclear explosives are placed below the surface of the earth by a depth of burial at least as great as 4 times the respective cavity radius of said two nuclear explosives plus 300 feet, said cavity radius for each of said nuclear explosives being determined in accordance with the folowing equation:

$$R = \frac{CW^{1/3}}{(dh)^{1/4}}$$

where R is the cavity radius in feet, C is a constant ranging between 225 and 345, W is the expected yield of each nuclear explosive in equivalent kilotons of TNT, $d$ is the average overburden density in grams per cubic centimeter ranging from about 1.6 to 2.7, and $h$ is the depth of burial in feet, and the predetermined distance that said two nuclear explosives are laterally spaced in less than said depth of burial.

8. The method of claim 7 wherein the expected yield of the first nuclear explosive is at least 5 kilotons of TNT and the expected yield of the second nuclear explosive is at least 5 kilotons of TNT.

9. The method of claim 1 wherein the predetermined time for detonation of the second explosive is between 0.5 second and 3 minutes after the first explosion.

10. The method of claim 9 wherein the predetermined distance that said two nuclear explosives are laterally spaced is a scaled distance of separation of 650 feet or less.

11. The method of claim 10 wherein the horizontally extended volume of high permeability is created in a hydrocarbon bearing formation.

12. The method of claim 10 wherein the predetermined distance that said two nuclear explosives are laterally spaced is a scaled distance of separation of 300 feet or less.

13. The method of claim 9 wherein the predetermined distance that said two nuclear explosives are laterally spaced is between 2 and 15 times the cavity radius for said second nuclear explosive when said cavity radius is determined in accordance with the folowing equation:

$$R = \frac{CW^{1/3}}{(dh)^{1/4}}$$

where R is said cavity radius in feet, C is a constant ranging between 225 and 345, W is the expected yield of said second nuclear explosion in equivalent kilotons of TNT, $d$ is the average overburden density in grams per cubic centimeter ranging from about 1.6 to 2.7, and $h$ is the depth of burial in feet.

14. The method of claim 13 wherein the two nuclear explosives are placed below the surface of the earth by a depth of burial at least as great as four times the respective cavity radius of said two nuclear explosives plus 300 feet, said cavity radius of each of said nuclear explosives being determined in accordance with the following equation:

$$R = \frac{CW^{1/3}}{(dh)^{1/4}}$$

where R is the cavity radius in feet, C is a constant ranging between 225 and 345, W is the expected yield of each nuclear explosive in equivalent kilotons of TNT, $d$ is the average overburden density in grams per cubic centimeter ranging from about 1.6 to 2.7, and $h$ is the depth of burial in feet, and the predetermined distance that said two nuclear explosives are laterally spaced is less than said depth of burial.

15. The method of claim 14 wherein the expected yield of the first nuclear explosive is at least 5 kilotons of TNT and the expected yield of the second nuclear explosive is at least 5 kilotons of TNT.

16. The method of claim 1 wherein the predetermined time for detonation of the second explosion is determined by waiting long enough for rock to fall from the roof of the first cavity, detecting arrival at the surface of the earth of the seismic waves created by said fallen rock striking the bottom of said first cavity and detonating said second nuclear explosion upon detecting said seismic waves.

17. The method of claim 16 wherein the predetermined distance that said two nuclear explosives are laterally spaced is a scaled distance of separation of 650 feet or less.

18. The method of claim 17 wherein the horizontally extended volume of high permeability is created in a hydrocarbon bearing formation.

19. The method of claim 17 wherein the predetermined distance that said two nuclear explosives are laterally spaced is a scaled distance of separation of 300 feet or less.

20. The method of claim 16 wherein the predetermined distance that said two nuclear explosives are laterally spaced is between 2 and 15 times the cavity radius for said second nuclear esplosive when said cavity radius is determined in accordance with the following equation:

$$R = \frac{CW^{1/3}}{(dh)^{1/4}}$$

where R is said cavity radius in feet, C is a constant ranging between 225 and 345, W is the expected yield of said second nuclear explosion in equivalent kilotons of TNT, $d$ is the average overburden density in grams per cubic centimeter ranging from about 1.6 to 2.7, and $h$ is the depth of burial in feet.

21. The method of claim 20 wherein the two nuclear explosives are placed below the surface of the earth by a depth of burial at least as great as 4 times the respective cavity radius of said two nuclear explosives plus 300 feet, said cavity radius for each of said nuclear explosives being determined in accordance with the following equation:

$$R = \frac{CW^{1/3}}{(dh)^{1/4}}$$

where R is the cavity radius in feet, C is a constant ranging between 225 and 345, W is the expected yield of each nuclear explosive in equivalent kilotons of TNT, $d$ is the average overburden density in grams per cubic centimeter ranging from about 1.6 to 2.7, and $h$ is the depth of burial in feet, and the predetermined distance that said two nuclear explosives are laterally spaced is less than said depth of burial.

22. The method of claim 21 wherein the expected yield of the first nuclear explosive is at least 5 kilotons of TNT and the expected yield of the second nuclear explosive is at least 5 kilotons of TNT.

References Cited

UNITED STATES PATENTS

| | | | |
|---|---|---|---|
| 3,303,881 | 2/1967 | Dixon | 166—36 |
| 3,342,257 | 9/1967 | Jacobs et al. | 166—36 |

FOREIGN PATENTS

| | | |
|---|---|---|
| 1,147,517 | 11/1957 | France. |
| 1,278,435 | 10/1961 | France. |

OTHER REFERENCES

Lekas et al., "Fracturing Oil Shale with Nuclear Explosives for In-Situ Retorting," Second Symposium on Oil Shale, Qtrly., Colorado School of Mines, Golden (July 1965), vol. 60, No. 3 (pp. 7–30).

Lombard et al., "Recovering Oil by Retorting a Nuclear Chimney in Oil Shale," Journal of Petroleum Technology, (June 1967) (pp. 727-734).

STEPHEN J. NOVOSAD, Primary Examiner